Jan. 8, 1952     F. W. TURRETTINI     2,581,823
PROJECTION OPTICAL MEASURING
DEVICE FOR MACHINE TOOLS

Filed June 7, 1949     5 Sheets-Sheet 1

Inventor:
FERNAND W. TURRETTINI
By Robert E. Burns
Attorney

Inventor:
FERNAND W. TURRETTINI

Inventor:
FERNAND W. TURRETTINI

Patented Jan. 8, 1952

2,581,823

UNITED STATES PATENT OFFICE 2,581,823

PROJECTION OPTICAL MEASURING DEVICE FOR MACHINE TOOLS

Fernand W. Turrettini, Bellevue-Geneva, Switzerland, assignor to Societe Genevoise d'Instruments de Physique, Geneva, Switzerland, a firm Application June 7, 1949, Serial No. 97,537
In Switzerland June 16, 1948

1 Claim. (Cl. 88—24)

Machine tools with accurate adjustment, optical adjustment for example, of the position of their tables or slides, are known. They are in general marking or boring machines, in which one of the slides is the table that carries the work, while the other carries the working spindle.

The optical measuring devices that consist of a micrometric microscope, usually rigid with the frame, for observing a graduated scale rigid with the moving table, have the advantage of being very accurate and of being adapted for rapid and convenient use.

The parts that compose an optical measuring device for a machine tool are therefore: the scale, the microscope in which the coincidence of a recticle or hair-line with the image of a mark on the scale is observed, the micrometer which serves to evaluate the fractions of a millimetre in displacing the hair-line or reticle in the field of the microscope, and an auxiliary graduation observable by the naked eye, which, co-operating with a pointer rigid with the movable table, serves to determine the whole number of millimetres included in the figure characterising the position of the table.

Since such machine tools have to permit measurements in a system of at least two axes of rectangular co-ordinates, the same parts are repeated for each axis of co-ordinates.

An adjustment of position of a table according to a numeral of co-ordinates therefore comprises, in the order of succession of the adjustment operations:

(1) A reading upon the auxiliary graduation in order to check the whole number of millimetres;
(2) The adjustment of the micrometer to the prescribed fraction of a millimetre;
(3) An observation in the eye-piece of the microscope;
(4) A manual action upon the handle that controls the slow movement of the table, in order to effect the coincidence of the reticle with the image of the mark in the field of the microscope;

that is, four operations altogether.

When it is a question of executing, upon a machine of this type, a series of work-pieces identical with one another involving a plurality of machining operations, the workman would save a considerable amount of time if he had the means of effecting these four adjusting operations for each of the machining operations of the first piece only of the series, and of effecting for the subsequent pieces of the series only a reduced number of adjustment operations such that each of the other pieces then presents itself exactly in the same way as the first piece in relation to the working spindle for all the machining operations that it has to undergo.

The present invention enables this aim to be attained. It relates to a machine tool comprising at least one table or slide movable upon a frame. It is characterised by the combination of a measuring device formed by a scale observed with a micrometric microscope, and a device enabling the positions already occupied by the table to be repeated, this second device comprising a set of abutments adjustable according to the initial adjustments of the positions of the table made with the scale and the microscope, and these abutments co-operating with a position-indicator.

Upon the first piece of the series the operator will adjust the successive positions that the piece to be worked must occupy in relation to the working spindle, by making use of all the elements of the optical measuring device, and for each of these positions he will adjust a stop in such a way that the position-indicator shows that the adjustment of this stop is correct. For the subsequent pieces he will obtain the repetition of the successive positions of the piece by referring solely to the position-indicator controlled by the stops adjusted in position at the time of the initial adjustment. If the indicator has the desired sensitiveness the working positions thus repeated will be as correct as those established by the initial adjustments effected on the first piece of the series to be executed.

One form of construction of the present invention is illustrated by way of example in the accompanying drawings, in which.

In these drawings, I is the frame of the machine, upon which a slide 2, forming a work-table, is movable on slideways 3 and 4 under the action of a screw 5 turning in bearings $1a$ and $1b$ on the frame and co-operating with a nut 6 solid with the table.

Figure 1:
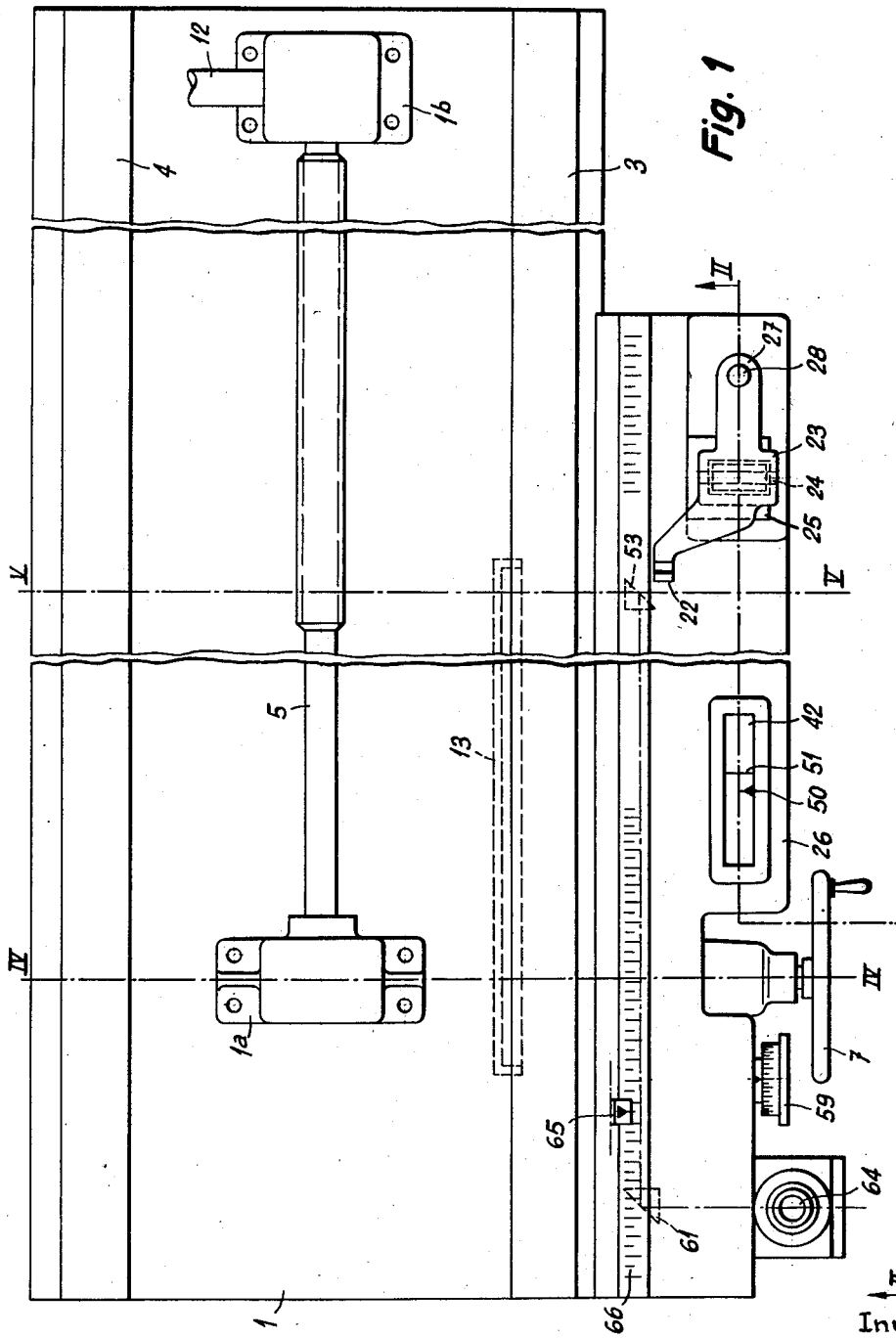
Figure 1 is a plan view, the movable slide being assumed to be removed.
Figure 4:
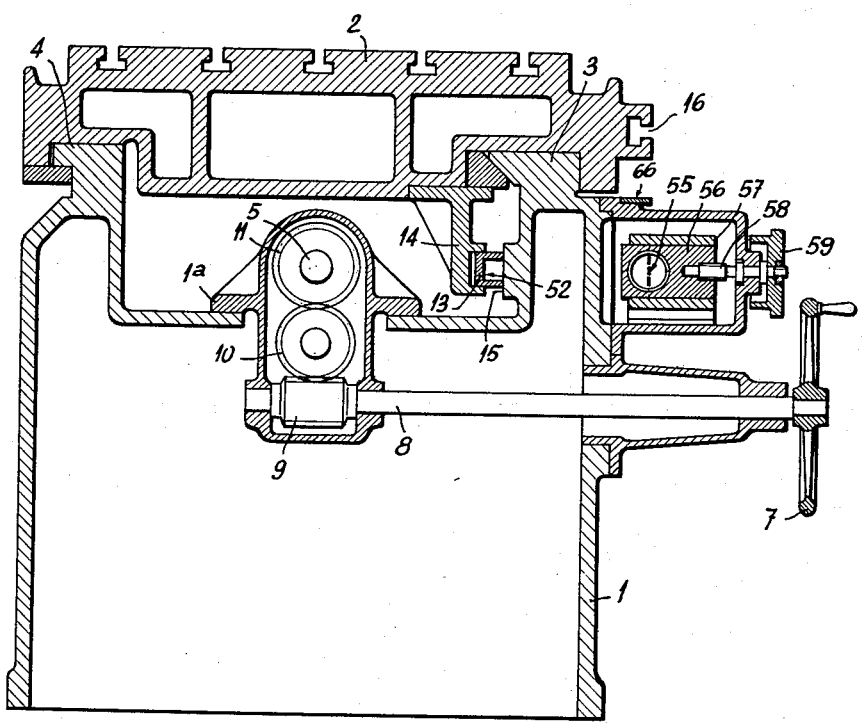
Figures 4 and 5 are sections on the lines IV—IV and V—V in Figure 1.

The screw 5 may be actuated either by hand, by means of a hand-wheel 7 shown in Figures 1 and 4, which is mounted upon a shaft 8, and drives the screw through pinions 9, 10 and 11, or else by means of a motor, not shown, which actuates the screw through a shaft 12, leading to the bearing 1b.

Figure 2:
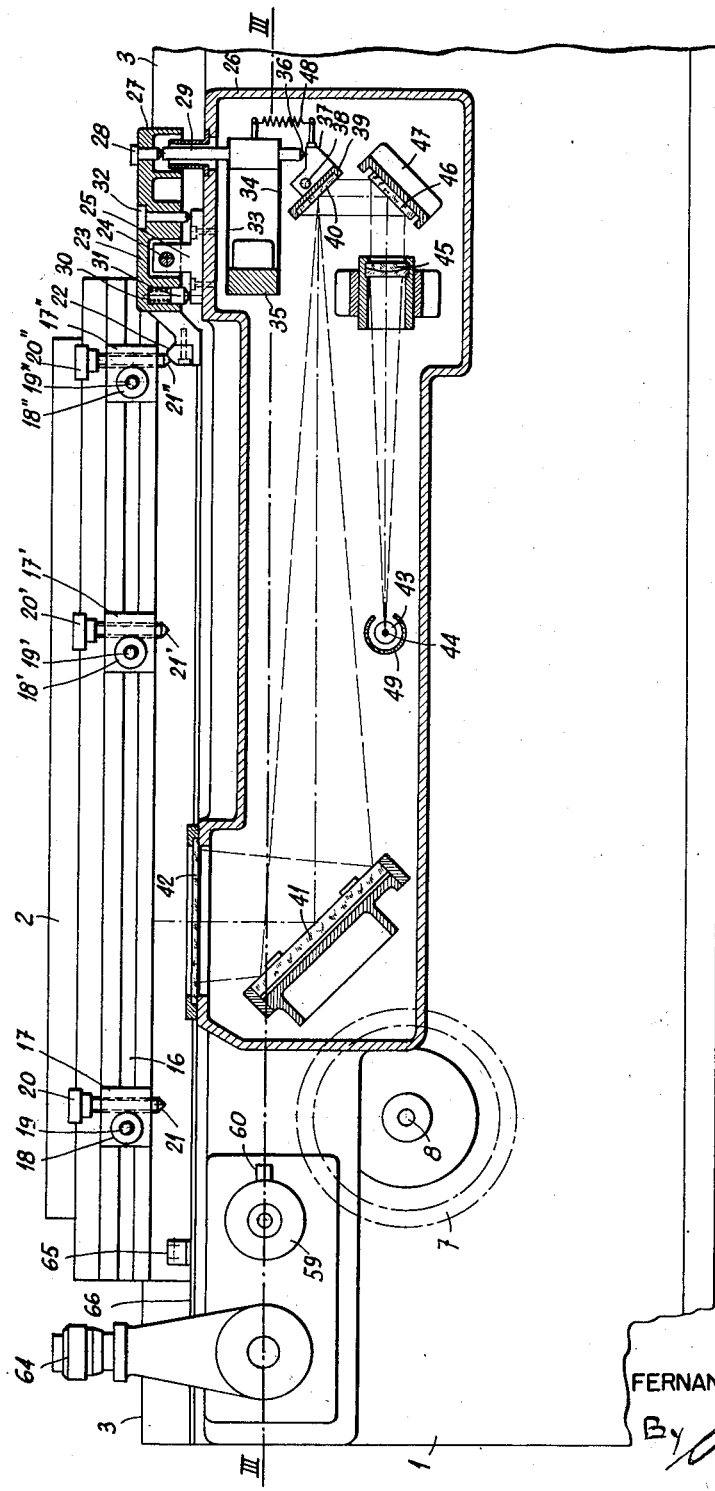
Figure 2 is a view in front elevation, with part in vertical section on the broken line II—II in Figure 1.
Figure 5:
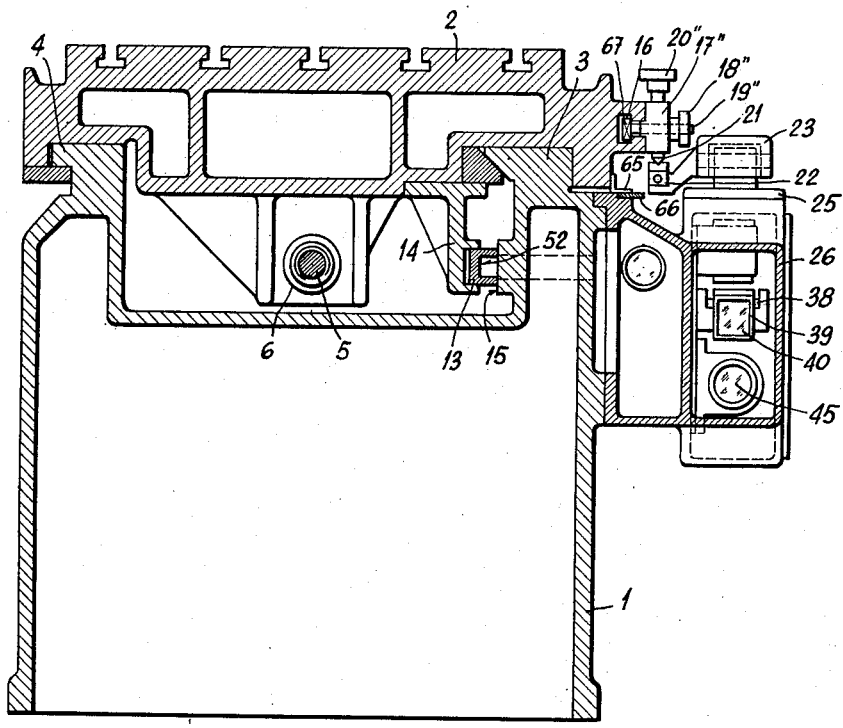

The scale 13 is shown in Figures 2 and 4. It is connected to the slide-table 2 by a bracket 14, and thus follows all the movements of the table by sliding along a face 15 on the frame. The table (see Figure 5) is provided with a longitudinal slot 16 forming a guide along which stops 17, 17' and 17" are adjustable in position, and can be fixed by means of locking nuts 18, 18' and 18", screwed on to tightening rods 19, 19' and 19", each terminating in a head 67 engaging in the slot 16.

Each of these adjustable stops (see also Figures 1 and 2) is equipped with an adjusting screw 20, 20', 20", preferably with a fine thread, the tips 21, 21' and 21" of these screws being conical. These tips co-operate with a prismatic piece 22, which has two inclined faces, and which is fixed upon one arm of a bent control lever 23, articulated at 24 to a bracket 25 fixed upon a casing 26, which encloses both the microscope and the position-indicator. The other arm 27 of the bent lever is provided with a projection such as a grain or bead 28, which acts upon one end of a pusher member 29. The lever 23 is subjected to three distinct actions, namely: (a) the action of the conical end 21" of the screw 20", which, acting upon the inclined faces of the piece 22, tends to rock the lever 23 in a counter-clockwise direction when the table is in motion; (b) the action of a spring 30 lodged in a cavity in the lever 23, exerted upon a piston 31 bearing upon the bracket 25 and tending to rock the lever in a clockwise direction; and (c) the action of a buffer 32, which limits the preceding action.

In this way the contact of the conical tip 21" with the prismatic piece 22 lowers the piece 22, which acts upon the position-indicator which is about to be described, but nevertheless then affords free passage to the tip 21", in order that the tip 21' may be able in its turn to produce the same effects.

All the adjustable stops 17, 17' and 17", however many there may be of them, can thus co-operate freely in turn with the lever 23.

The position-indicator comprises the push member 29, articulated upon two flexible blades 33 and 34, which are fixed at one end to the push member and at the other end to a bracket 35 solid with the casing 26, so that the members 29, 33, 34 and 35 form a parallelogram deformable without friction, and ensuring, within the limits of its elastic deformation, the vertical position of 29.

The inner or lower end 36 of the push member 29, in the form of a blunt point or of a knife-edge, acts upon a member 37, rotatably mounted at 38 upon the casing 26. The member 37 is fixed upon an oscillating frame 39 containing a mirror 40, which reflects the image of a lamp bulb 43 containing a rectilinear filament 44 towards a fixed mirror 41, which in turn reflects it on to a translucent screen 42, provided with a pointer 50, shown in Figure 1. This image is formed by an objective lens 45, and is reflected towards the movable mirror 40 by a fixed mirror 46 carried by a bracket 47. A spring 48, stretched between the members 37 and 29, ensures contact between the tip 36 and the member 37.

In order to obviate parasitic radiation of light from the lamp bulb 43 in the direction of the screen 42, this bulb is surrounded by a protective tube 49, open only on the side facing the objective lens 45. On the screen 42 (see Figure 1) will be seen a fixed pointer 50 and a bright mark 51, which will be the image of the filament 44. The adjustment of position will be considered perfect when the bright mark 51 coincides with the fixed datum 50.

Figure 3:
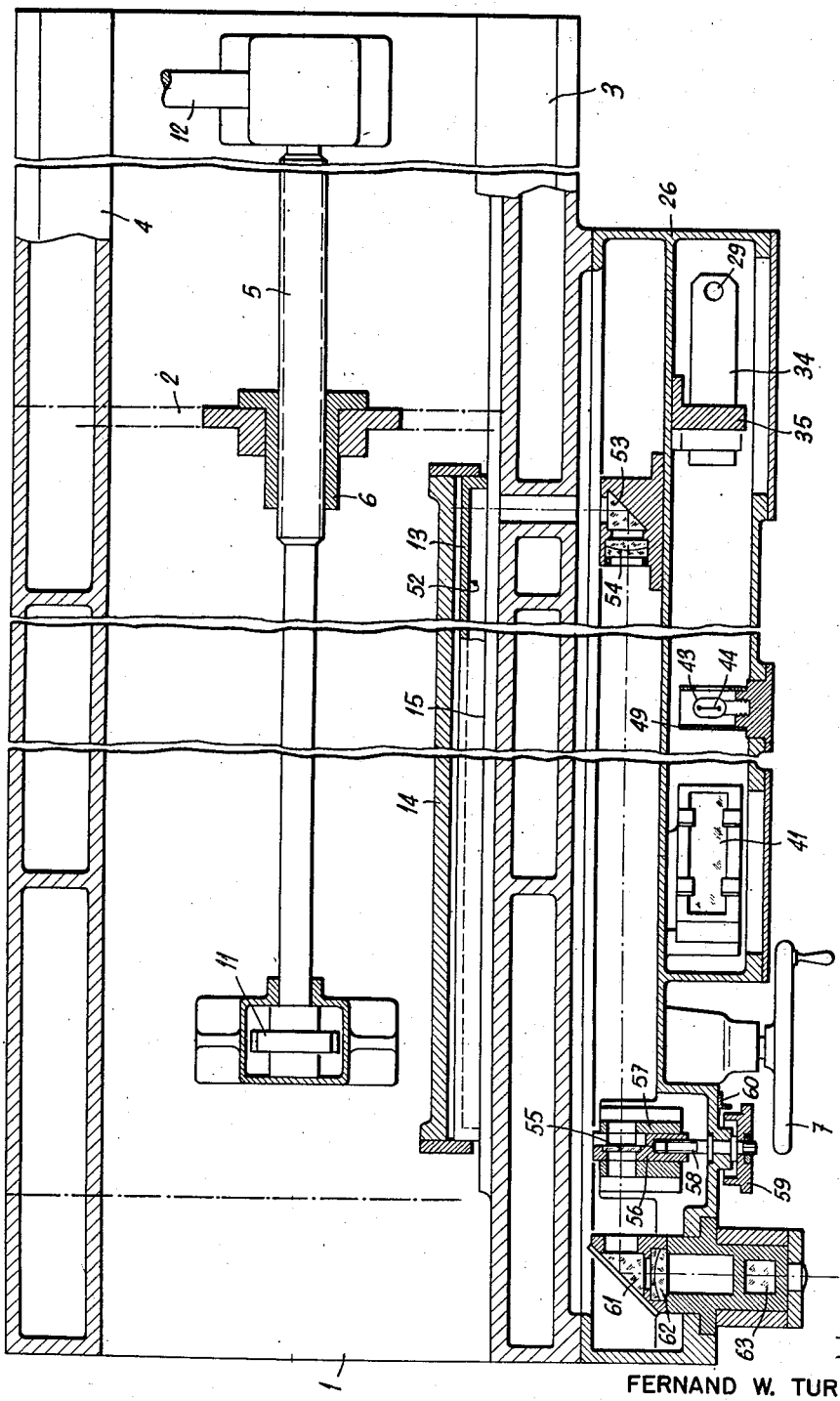
Figure 3 is a horizontal section on the line III—III in Figure 2.

The precision measuring device comprises a micrometric microscope the construction and operation of which are known. The scale (see Figures 3 and 4) is at 13. It is graduated on its inner face 52. A prism 53 deflects the optical axis in the direction of an objective lens 54 and of a reticle or hair-line 55, which is mounted upon a ram or slide 56, movable in a guide 57, under the action of a micrometer screw 58 carrying a graduated head 59, turning opposite to a pointer 60.

The optical axis is again deflected by a prism 61 in the direction of a second objective lens 62 and of a prism 63, which returns the optical axis vertically into the eye-piece 64, where the image of a mark in the graduation of the scale, and the reticle 55, are observed simultaneously.

The apparatus as a whole operates in the following manner: Assuming that the co-ordinate of a machining position of the piece is 300.469, the workman places the drum or graduated head 59 of the micrometer to the reading 0.469, and then, acting upon the mechanical table-control device, displaces it until the pointer 65 comes into the immediate neighborhood of the mark 300 millimetres upon an auxiliary scale 66. Finally, acting upon the manual control device, he brings the mark of the graduation into coincidence with the reticle in the field of the eye-piece 64.

At this moment he slides one of the adjustable stops 17 in the slot 16 until the conical point 21 of the screw 20 comes into contact with the prismatic piece 22 that actuates the position-indicator. He tightens the nut 18, which immobilises the abutment 17 in the slot 16, and, by acting upon the screw 20, he brings the image 51 of the filament to the pointer 50.

He proceeds in the same way for all the other co-ordinates that will have to be repeated. Subsequently, in order to bring the table back into the position according to the co-ordinates thus marked, he will utilize only the mechanical control device, not shown, of the screw 5, and its manual control device, in order to repeat, for all the work-pieces to be machined in series, the co-ordinates marked for the first piece of the series. He will not have to effect again any adjustment on the micrometer, or any observations either upon the auxiliary scale, provided he has taken care to effect all his adjustments in the same direction of advance of the table, or upon the microscope, and will thus save considerable time.

The sensitiveness of the position-indicator will be sufficient when its magnification is of the order of 100 diameters, which has the result that a change of position of the table amounting to 0.01 mm. will appear on the screen 42 as a distance of 1 millimetre between the pointer 50 and the bright mark 51.

In the form of construction described, this indicating device is an optical indicator, but it would be quite possible to provide a mechanical or electrical indicating device that moves a needle over a dial or acts upon any other reading member.

What I claim is:

In a machine-tool comprising at least one table slidably movable upon a frame and a measuring device for carrying out the initial adjustments of the positions of said table, said measuring device comprising a scale dependent from and secured to said table and optical means for the observation of said scale, in combination, a set of stops adjustably mounted on said table; a projecting device comprising a screen, a mirror oscillatably mounted on said frame and a source of light the image of which is projected on said screen by means of said mirror; a pointer on said screen; and a swinging member operatably connected with said mirror, a part of said member being situated on the path of said stops in operative relationship thereto so that when the table is displaced, said stops swing said swinging member which displaces said mirror, the image of the source of light being thus displaced on said screen whereby, when the table is brought again in its initial positions, said positions can be checked, without using said measuring device, by observing the image of the source of light on said screen.

FERNAND W. TURRETTINI.

REFERENCES CITED

The following references are of record in the file of this patent:

UNITED STATES PATENTS

| Number | Name | Date |
|---|---|---|
| 1,974,606 | Fassin | Sept. 25, 1934 |
| 2,302,572 | Reason | Nov. 17, 1942 |
| 2,422,611 | Becker | June 17, 1947 |